(12) United States Patent
Rezaei

(10) Patent No.: US 9,463,567 B2
(45) Date of Patent: Oct. 11, 2016

(54) ADJUSTABLE HANDLE ASSEMBLY

(71) Applicant: Broadway Industrial Group Limited, Singapore (SG)

(72) Inventor: Frederick Rezaei, Phoenix, AZ (US)

(73) Assignee: Broadway Industrial Group Limited, Singapore (SG)

( * ) Notice: Subject to any disclaimer, the term of this patent is extended or adjusted under 35 U.S.C. 154(b) by 0 days.

(21) Appl. No.: 14/478,155

(22) Filed: Sep. 5, 2014

(65) Prior Publication Data

US 2015/0074947 A1 Mar. 19, 2015

Related U.S. Application Data

(60) Provisional application No. 61/877,748, filed on Sep. 13, 2013.

(51) Int. Cl.
*B25G 1/04* (2006.01)

(52) U.S. Cl.
CPC ............... *B25G 1/04* (2013.01); *Y10T 16/473* (2015.01)

(58) Field of Classification Search
CPC . Y10T 16/44; Y10T 16/4554; Y10T 16/473; B25G 1/04; B62B 1/047; B62B 5/065; B62B 5/067; B62B 9/12; B62B 9/20; A45C 13/262; A45C 2013/267
USPC .................. 16/110.1, 405, 429; 280/47.371, 280/47.315, 655.1; 15/144.4
See application file for complete search history.

(56) References Cited

U.S. PATENT DOCUMENTS

| | | | |
|---|---|---|---|
| 4,354,689 A * | 10/1982 | Perego ..................... 280/47.371 |
| 5,625,923 A * | 5/1997 | Huang ............................ 16/429 |
| 5,845,916 A | 12/1998 | Stroud | |
| 5,845,917 A | 12/1998 | Huang | |
| 5,988,669 A | 11/1999 | Freese | |
| 6,070,889 A * | 6/2000 | Handberry ............... 280/47.315 |
| 6,098,492 A | 8/2000 | Juchniewicz | |
| 6,101,678 A | 8/2000 | Malloy | |
| 6,312,005 B1 * | 11/2001 | Lin ............................... 280/647 |
| 7,011,335 B2 * | 3/2006 | Kight .......................... 280/655.1 |
| 8,234,755 B1 * | 8/2012 | Brand et al. .................... 16/427 |

* cited by examiner

*Primary Examiner* — William Miller
(74) *Attorney, Agent, or Firm* — Lewis Kohn & Walker LLP; David M. Kohn; Kari Moyer-Henry

(57) ABSTRACT

An adjustable handle assembly for adjusting height and/or rotational position of the handles on a stroller wherein the stroller has two vertical posts. The adjustable handle assembly includes predetermined internal grooves on the inner surface of the handle corresponding to the holes along the post and combination spring pins which protrude from holes along the post such that the pin engages with the holes when the pin encounters a corresponding hole in the handle. When slightly compressed the pin will travel along the internal grooves inside the handle. In an alternative embodiment the adjustable handle assembly includes a connector for vertical and/or rotational adjustment of the handle about a vertical post.

6 Claims, 6 Drawing Sheets

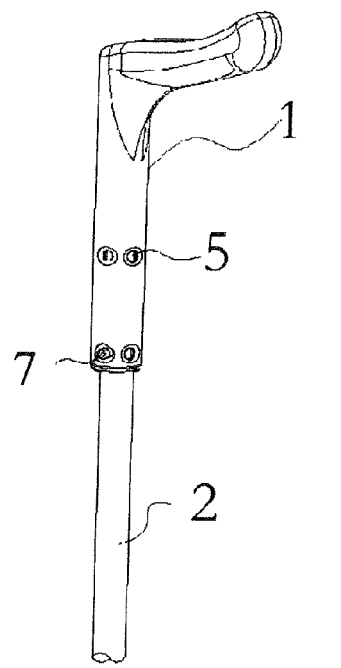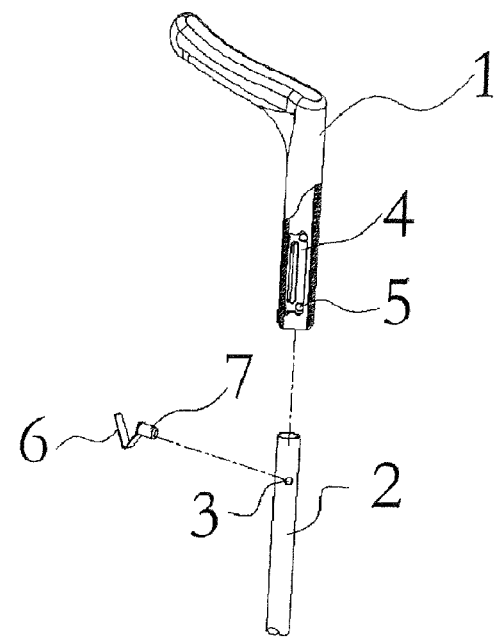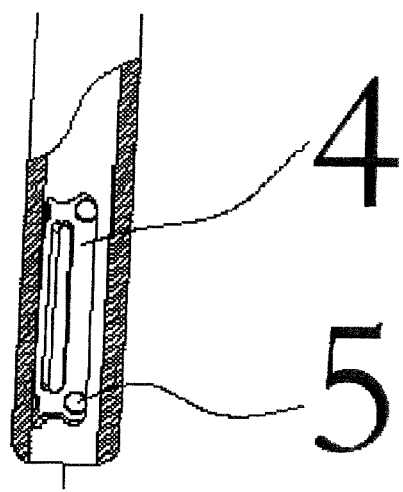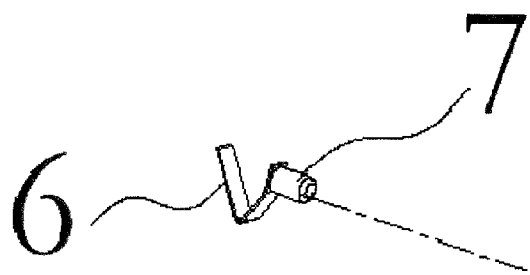
Fig 1
Fig 2
Fig 3
Fig 4

ADJUSTABLE HANDLE ASSEMBLY

RELATED APPLICATIONS

This application is a non-provisional patent application claiming the benefit of priority from U.S. Provisional Pat. App. Ser. No. 61/877,748 filed Sep. 13, 2013, the entire contents of which are incorporated by reference herein.

FIELD OF THE INVENTION

The present invention pertains generally to adjustable handle assemblies. More particularly, the present invention pertains to an adjustable handle assembly for umbrella type foldable strollers.

BACKGROUND OF THE ART

Child strollers are well known in the prior art. Strollers are available in a variety of sizes and weights depending on the features desired by the caregiver. Often, more bulky strollers, such as the stroller travel systems are also more expensive and inconvenient for storage and transport of the stroller when not in use.

Umbrella strollers are often an alternative favored by caregivers faced with limited storage space or the need for portability of the stroller when not in use. Umbrella strollers are generally more compact due in large part to their simpler design. The simpler designs of umbrella strollers lead to limited features for the user and the compact design, although a desired feature, also results in the stroller often times being too short for the taller caregiver to use comfortably. As a result, a caregiver that is taller or larger than average must walk hunched over in an awkward position when pushing the stroller.

In addition, umbrella strollers are typically equipped with handles having curved ends, for example, J-shaped, which are meant to serve as a handle for carrying the stroller when folded. However, these curved handles prevent the stroller from folding completely flat when not in use which can lead to an inconvenient shape of the stroller for storing and transporting or shipping purposes.

Examples of the prior art stroller handle extensions are found in the following patents:

U.S. Pat. No. 5,625,923, issued May 6, 1997, to Huang discloses a concentric nested tube extension which adjustably telescopes to lengthen the handle. It requires an expensive and complicated locking mechanism to retain the handle extension at the selected length and because of its design cannot be adapted to existing or pre-manufactured handles;

U.S. Pat. No. 5,845,917, issued Dec. 8, 1998, to Huang discloses a simpler version of the telescoping extension described in U.S. Pat. No. 5,625,923. However, it suffers from a similar defect in that retrofitting to existing, pre-manufactured handles is impossible.

U.S. Pat. No. 5,845,916, issued Dec. 8, 1998, to Stroud is of a unique configuration which provides an ergonomically oriented push bar grip configuration but it is not a stroller handle extension.

U.S. Pat. No. 5,988,669, issued Nov. 23, 1999, to Freese et al. recognizes the need for an ergonomic grip handle for a stroller but lacks a handle extension.

U.S. Pat. No. 6,098,492, issued Aug. 8, 2000, to Juchniewicz et al. discloses an extension handle which can be secured to certain pre-manufactured designs. However, it provides the same non-ergonomic handle orientation as the pre-existing handle that it purports to improve.

U.S. Pat. No. 6,101,678, issued Aug. 15, 2000, to Malloy et al. discloses an adjustable handle for the purpose for raising or lowering its height. It does not extend its length beyond its arc of orientation.

In light of the above, it is an object of the present invention to provide the desired features described herein as well as additional advantages such as increasing the opportunity for customization for height and ergonomic adjustment of the handle assembly both when in use and during storage and transporting or shipping.

SUMMARY OF THE INVENTION

The present invention is directed to solving the deficiency in the art pertaining to the availability of handle adjustment for umbrella strollers. It is one object of the present invention to provide an adjustable handle assembly which allows for vertical height adjustment.

It is another object of the present invention to provide an adjustable handle assembly which may be secured in an ergonomic handle position for comfortable use, storage and transporting or shipping.

It is another object of the present invention to provide an adjustable handle assembly which is capable of achieving a relatively flat, zero degree position for storage and transporting or shipping.

It is another object of the present invention to provide an adjustable handle assembly which eliminates the need for addition guiding systems incorporated into the handles.

It is yet another object of the present invention to provide an adjustable handle assembly with reduced complexity for the operator by guiding the handle from one position to another.

It is still another object of the present invention to provide an adjustable handle assembly that is easy to assemble and maintain.

It is still another object of the present invention to provide an adjustable handle assembly which is low in cost and requires only minimal parts, i.e. two parts.

It is still another object of the present invention to provide adjustment means for two connecting posts which need to be fixed together but still enable them to have rotational and length adjustment ability at low cost. Applications where rotational and length adjustments are desirable include but are not limited to baby high chairs with folding and height adjustment, basinet frames, camera tripods, umbrellas, canopies, folding chairs, and the like.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 illustrates a side perspective view of the adjustable handle assembly.

FIG. 2 illustrates an exploded side perspective view of the adjustable handle assembly.

FIG. 3 illustrates a close-up view of the locking feature of the adjustable handle assembly.

FIG. 4 illustrates a close-up view of the spring pin of the adjustable handle assembly.

DETAILED DESCRIPTION OF THE INVENTION

Figure 5:
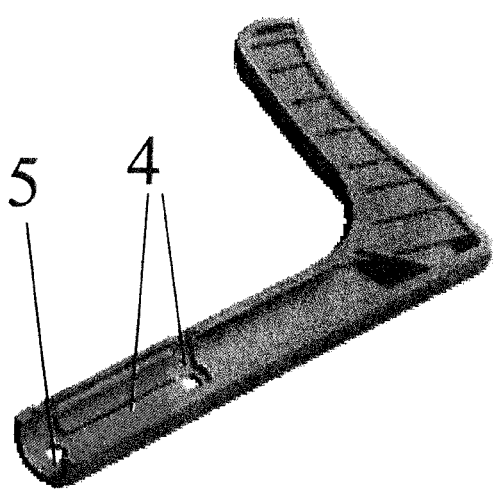
FIG. 5 illustrates a close-up cutaway view of the inside mechanism of the locking feature of the adjustable handle assembly.

An adjustable handle assembly is illustrated in a side perspective view in FIG. 1. The adjustable handle assembly has an adjustable handle 1 which slides over a post 2. The adjustable handle 1 has pre-determined holes 5 which when the pin 7 reaches the holes 5 said pin 7 will protrude from said holes 5 to secure the adjustable handle 1 to the post 2 in the desired position.

An adjustable handle assembly is illustrated in exploded perspective view in FIG. 2. The adjustable handle 1 further has an internal groove 4 to allow pin 7 to slide through the path of internal groove 4 in a controlled manner. In an alternative embodiment, the post 2 may have pre-determined holes 3 to accommodate multiple combination springs 6 and pins 7 to increase the load and redundancy for securing the post 2 to the adjustable handle 1. Said spring 6 has an attached pin 7 which is inserted into post 2 such that pin 7 protrudes from hole 3. Spring 6 biases the pin 7 to engage with holes 3 so that the adjustable handle 1 cannot move when pin 7 is engaged with hole 3. The adjustable handle 1 is freely movable about post 2 when pin 7 is depressed against spring 6. The position of the adjustable handle 1 can be changed relative to post 2 by compressing the protruded pin 7 to release pin 7 from hole 3 of the adjustable handle 1 and subsequently moving the adjustable handle 1 to allow the pin 7 to slide within the internal groove 4 to the next pre-determined hole 5 on the adjustable handle 1. The described features of the adjustable handle assembly allow the adjustable handle 1 to adjust along the post 2 to enable the handle assembly to provide different height positions for the operator. The described features further allow the adjustable handle 1 to rotate around the post 2 by moving the pin 7 within the internal groove 4 to enable the adjustable handle to be secured in an ergonomic position for storage and or shipping. The ergonomic position may be any degree angle depending on the desired position and use. Additionally, the handle assembly may be positioned at a zero degree angle to allow for the relatively flat positioning of said handles for compact storage and transporting or shipping.

Reference is made to FIG. 3 which illustrates a close-up view of the internal grooves 4 and pre-determined holes 5 within the adjustable handle 1.

Reference is made to FIG. 4 which illustrates a close-up view of the combination spring 6 with attached pin 7 for use in an alternate embodiment of the adjustable handle assembly.

Reference is made to FIG. 5 which illustrates a close-up view of the internal grooves 4 and holes 5 which allow the adjustable handle 1 to turn for ergonomic use and stowage. The ergonomic position may be any degree angle depending on the desired position and use. Additionally, the handle assembly may be positioned at a zero degree angle to allow for the relatively flat positioning of said handles for compact storage and transporting or shipping.

Figure 6:
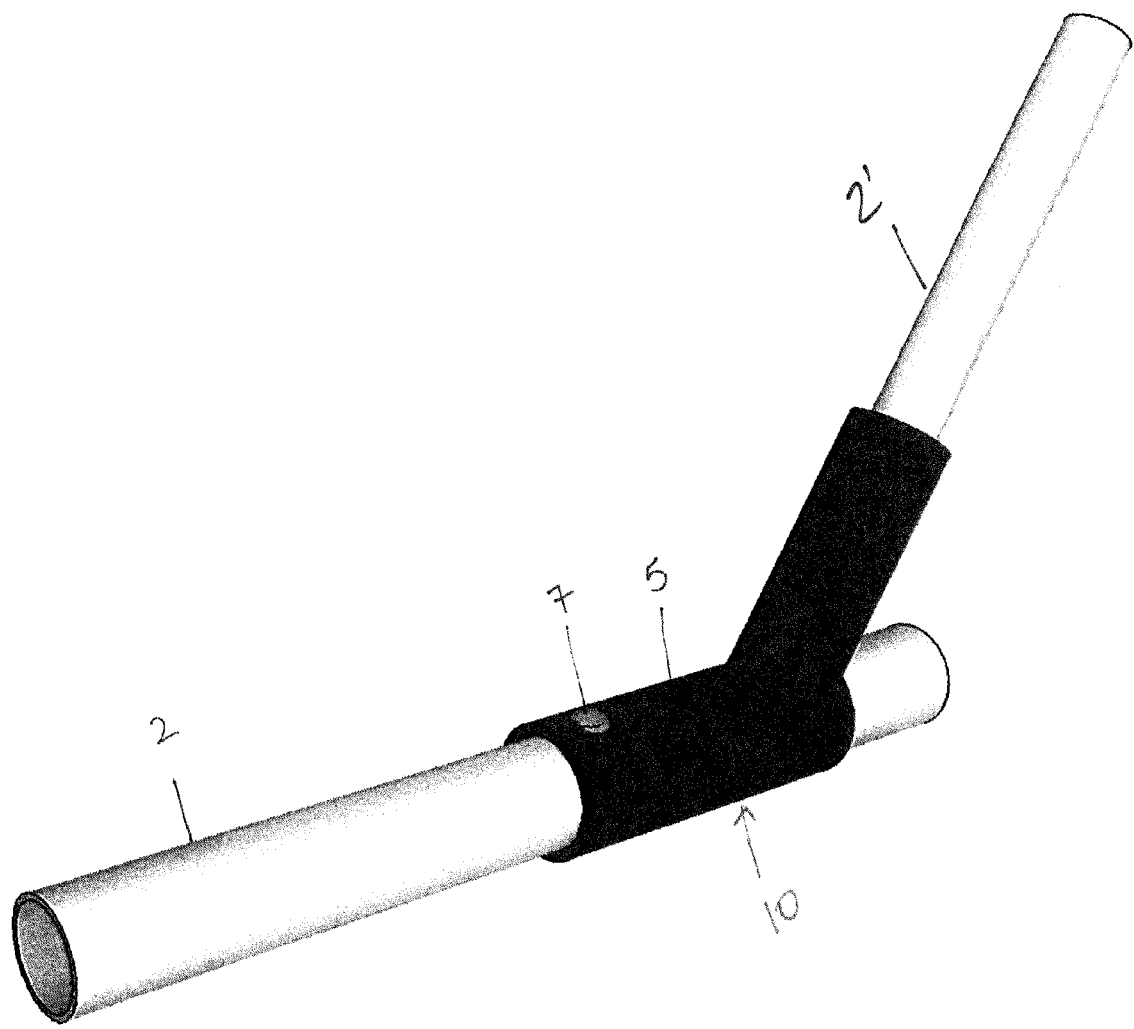
FIG. 6 illustrates an alternate embodiment of the adjustable handle assembly in the home position.

Reference is made to FIG. 6 which illustrates an alternate embodiment of the assembly used for any additional application wherein a second post 2' may adjust vertically along the first post 2 using pre-determined positions or holes 5 located in connector 10 wherein the pin 7 is guided to catch said pre-determined holes 5. As connector 10 is moved up or down along the first post 2, pin 7 will catch in pre-determined holes 5 locking the assembly into place. Spring 6 (not shown) biases the pin 7 to engage with holes 5 so that connector 10 cannot move when pin 7 is engaged with hole 5. The connector 10 is freely movable about the first post 2 when pin 7 is depressed against spring 6 (not shown). The present embodiment may be used for a variety of additional applications such as outdoor seat awnings, outdoor umbrellas and any other application which may require pre-determined movement of adjoined piping and self-guiding of said movement.

Figure 7:
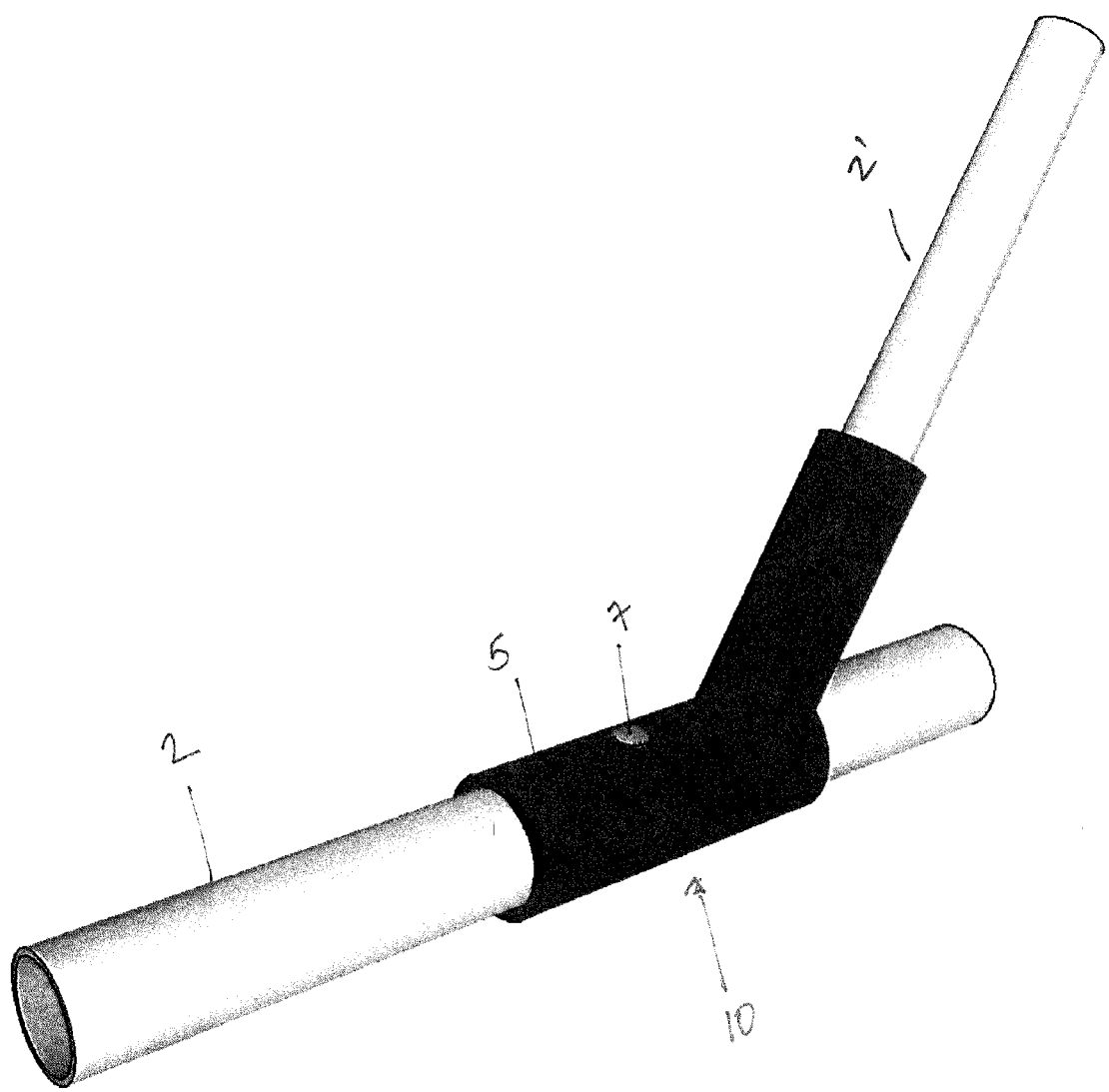
FIG. 7 illustrates an alternate embodiment of the adjustable handle assembly in a second position.

Reference is made to FIG. 7 which illustrates an alternate embodiment of the assembly used for any additional application as shown in a second position wherein the second post 2' may adjust vertically along the first post 2 using pre-determined positions or holes 5 located in connector 10 wherein the pin 7 is guided to catch said pre-determined holes 5. As connector 10 is moved up or down along the first post 2, pin 7 will catch in pre-determined holes 5 locking the assembly into place.

Figure 8:
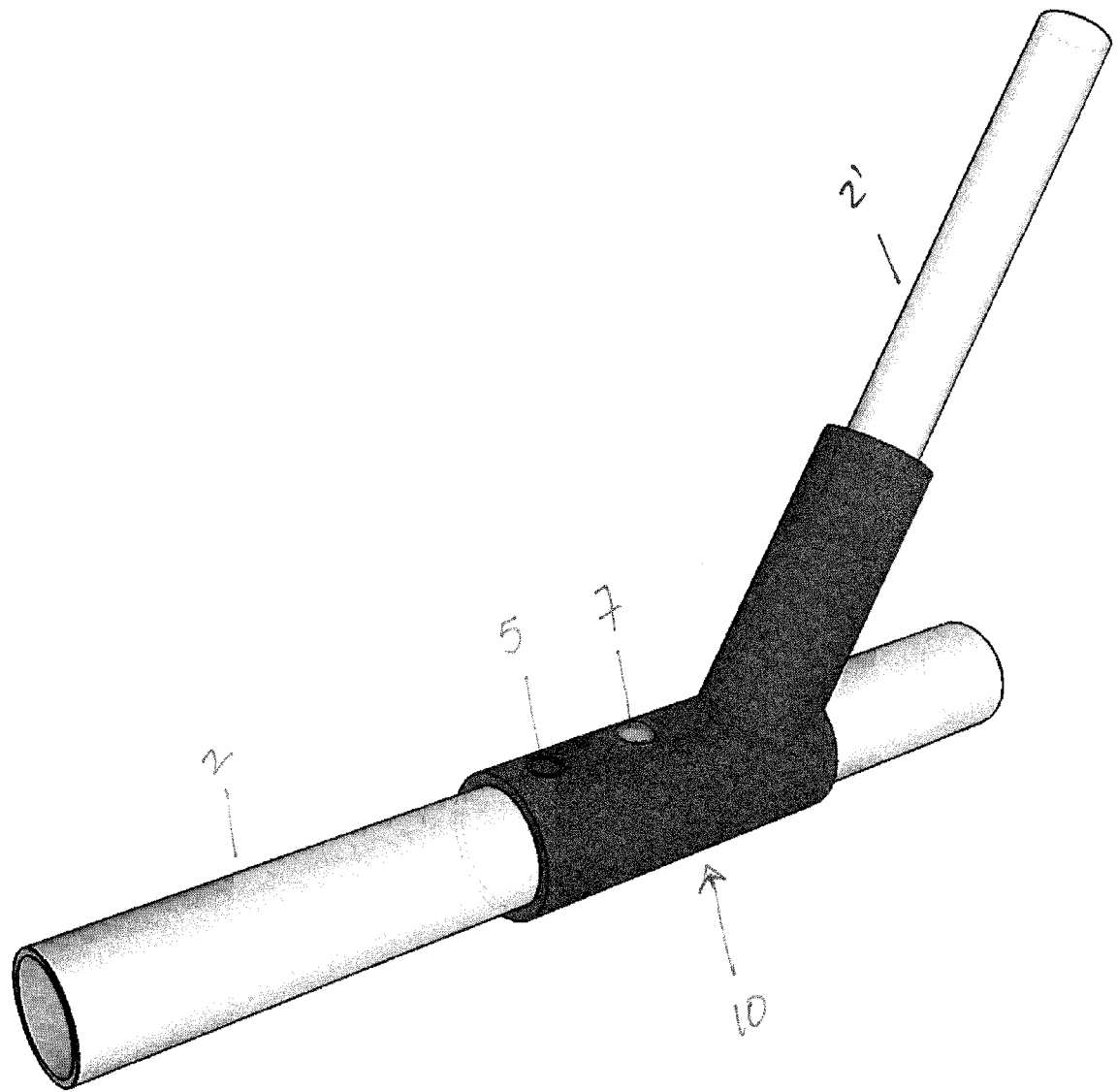
FIG. 8 illustrates the components of the adjustable handle assembly in relationship to each other.

Reference is made to FIG. 8 which illustrates a transparent view of the assembly shown in FIG. 7 demonstrating the relative position of the first post 2 within connector 10 when the assembly is locked in a pre-determined position as described.

Figure 9:
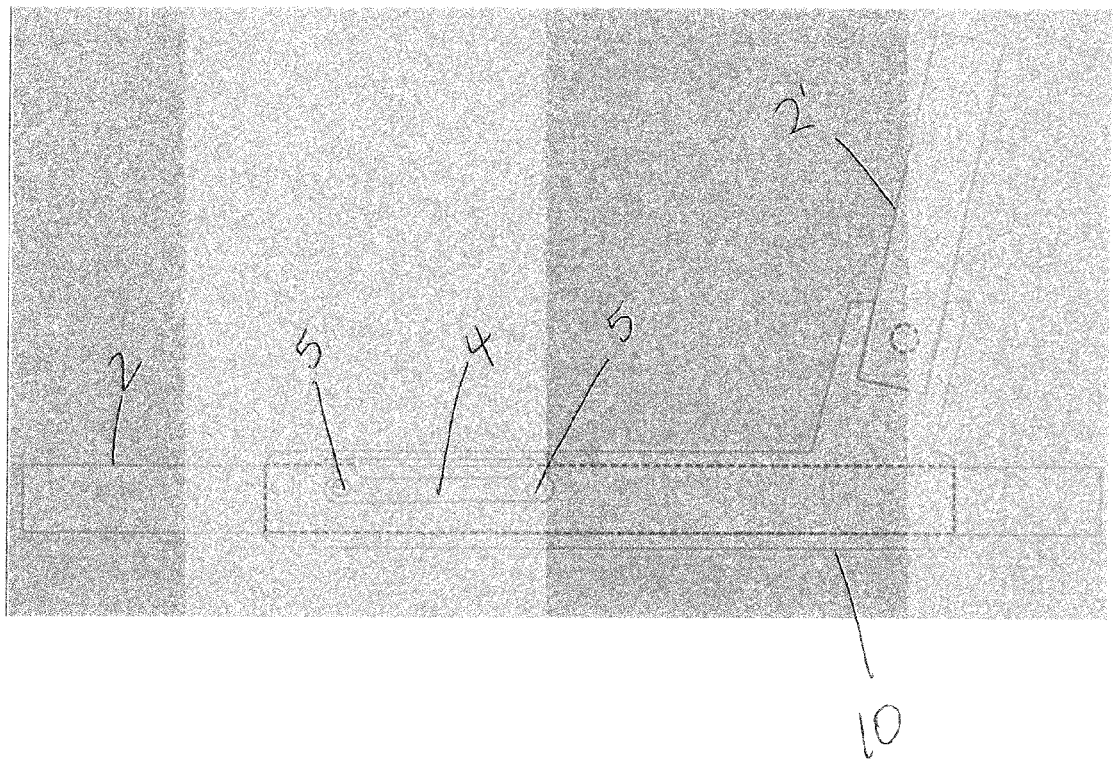
FIG. 9 illustrates a cross-section of the adjustable handle assembly of FIG. 7.

Reference is made to FIG. 9 which illustrates a cross-section view of the assembly shown in FIG. 7 demonstrating the position of internal groove 4 and pre-determined holes 5 in connector 10.

One embodiment of the present invention provides an adjustable handle assembly for improving the functionality of the umbrella stroller handle.

Another embodiment of the present invention provides for vertical height adjustment of the adjustable handle assembly.

Yet another embodiment of the present invention provides for the ergonomic adjustment of the adjustable handle assembly. Such ergonomic adjustment allows for the handle assembly to achieve any degree angle position as desired by the user.

Still another embodiment of the present invention provides an adjustable handle assembly which is capable of achieving a relatively flat, zero degree angle of the assembly for convenience of storage, transporting or shipping.

It is further contemplated that the method of adjustment of the present invention may be used to provide adjustable features on additional products such as infant folding beds, stroller shade canopies and the like.

It is still further contemplated that the method of adjustment of the present invention may be applied to a variety of additional applications such as outdoor seat awnings, outdoor umbrellas and any other application which may require pre-determined movement of adjoined piping and self-guiding of said movement.

It will be appreciated that details of the foregoing embodiments, given for purposes of illustration, are not to be construed as limiting the scope of the invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present invention.

What is claimed is:

1. An adjustable handle assembly for adjusting the handles of an umbrella stroller, wherein the adjustable handle assembly is comprised of:
   a handle component with a plurality of holes therein;
   a vertical post inserted into the handle component, the vertical post having at least one hole therein; and
   at least one combination spring pin within the vertical post such that the combination spring pin protrudes from the hole in the vertical post when the spring pin is in the decompressed position;
wherein the handle component has internal grooves located on the inner surface of the handle component which correspond to and interconnect the plurality of holes.

2. The adjustable handle assembly of claim 1, wherein the spring pin travels within the internal grooves of the handle component to allow for the movement of the handle component about the vertical post.

3. The adjustable handle assembly of claim 2, wherein the internal grooves of the handle component allow for the height and/or rotational adjustment of the handle component.

4. The adjustable handle assembly of claim 2, wherein the interaction of the spring pin with at least one hole out of the plurality of holes in the handle component results in the spring pin engaging with the hole in the handle component locking the handle component in position relative to the post.

5. The adjustable handle assembly of claim 4, wherein the compression of the spring pin releases the handle component from the locked position and allows for the subsequent movement of the handle component about the post.

6. The adjustable handle assembly of claim 1, wherein the handle component is capable of achieving a relatively flat, zero degree position relative to the post for storage, transporting and/or shipping of the stroller.

\* \* \* \* \*